(12) United States Patent
Jung et al.

(10) Patent No.: US 12,436,649 B2
(45) Date of Patent: Oct. 7, 2025

(54) TOUCH SYSTEM AND DISPLAY DEVICE

(71) Applicant: Samsung Display Co., Ltd., Yongin-si (KR)

(72) Inventors: Keum Dong Jung, Yongin-si (KR); Jang Hui Kim, Yongin-si (KR); Ji Hoon Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/596,999

(22) Filed: Mar. 6, 2024

(65) Prior Publication Data

US 2025/0053264 A1 Feb. 13, 2025

(30) Foreign Application Priority Data

Aug. 7, 2023 (KR) .......................... 10-2023-0102987

(51) Int. Cl.
*G06F 3/044* (2006.01)
*G06F 3/041* (2006.01)

(52) U.S. Cl.
CPC .......... *G06F 3/0441* (2019.05); *G06F 3/0412* (2013.01); *G06F 3/04162* (2019.05); *G06F 3/0446* (2019.05); *G06F 2203/04104* (2013.01)

(58) Field of Classification Search
CPC ................... G06F 3/0441; G06F 2203/04104
See application file for complete search history.

(56) References Cited

U.S. PATENT DOCUMENTS

| | | | |
|---|---|---|---|
| 9,329,708 B2 | 5/2016 | Westhues | |
| 9,606,646 B2 | 3/2017 | Westhues | |
| 9,916,022 B2 | 3/2018 | Westhues | |
| 9,927,909 B2 | 3/2018 | Westhues et al. | |
| 10,817,083 B2 | 10/2020 | Gur et al. | |
| 11,494,027 B2 | 11/2022 | Kim et al. | |
| 11,868,556 B2 * | 1/2024 | Konda | G06F 3/04162 |
| 12,337,828 B2 * | 6/2025 | Hashimoto | B60W 60/001 |
| 2014/0192028 A1 * | 7/2014 | Leydon | G06F 3/03545 |
| | | | 345/179 |
| 2015/0193033 A1 * | 7/2015 | Westhues | G06F 3/04166 |
| | | | 345/173 |
| 2015/0355734 A1 * | 12/2015 | Lo | G06F 3/0383 |
| | | | 345/179 |
| 2016/0077784 A1 * | 3/2016 | Yamada | G06F 3/0321 |
| | | | 345/2.3 |
| 2019/0102021 A1 * | 4/2019 | Jang | G06F 3/04166 |
| 2019/0235646 A1 * | 8/2019 | Karsuntsev | G06F 1/1681 |
| 2019/0354203 A1 * | 11/2019 | Fleck | G06F 3/0442 |
| 2021/0055829 A1 * | 2/2021 | Miyamoto | H04W 72/0446 |
| 2023/0409143 A1 * | 12/2023 | Nomura | G06F 3/0446 |
| 2024/0022847 A1 * | 1/2024 | Goh | H04W 4/80 |

* cited by examiner

*Primary Examiner* — William Boddie
*Assistant Examiner* — Bipin Gyawali
(74) *Attorney, Agent, or Firm* — Innovation Counsel LLP

(57) ABSTRACT

A touch system may include a touch array including touch electrodes, a touch driver configured to apply touch driving signals including different codes to the touch electrodes to thereby transmit uplink signals to objects adjacent to the touch array, at least one sub-host connected to at least one object among the objects through a communication channel, and configured to receive, from the at least one object, position information corresponding to the at least one object through the communication channel, and a main host configured to receive the position information corresponding to the at least one object through the at least one sub-host.

18 Claims, 12 Drawing Sheets

TOUCH SYSTEM AND DISPLAY DEVICE

CROSS-REFERENCE TO RELATED APPLICATION

The present application claims priority under 35 U.S.C. § 119 to Korean patent application number 10-2023-0102987 filed on Aug. 7, 2023, the entire disclosure of which is incorporated herein in its entirety by reference.

BACKGROUND

Field of Invention

Various embodiments of the present disclosure relate to an electronic device supporting a touch function, and more particularly, to a display device or a touch system using a touch device configured to sense objects or a touch of a user.

Description of Related Art

Electronic devices with touch panels that have the capability to indicate positions through touch are widely used. Particularly, with the proliferation of mobile electronic devices such as smartphones and tablet computers, touch panels have become widely used. Recently, there has been an increasing demand for technology that can recognize touches on touch panels not only with fingers but also with other tools such as active pens.

However, there are a lot of difficulties for electronic devices to efficiently support both touches from fingers or the like and touches from active pens while still providing basic display functionality. Particularly, with the trend toward larger and faster displays in electronic devices, there is a risk of degradation in sensing performance for touch recognition on the touch panels, thus leading to a reduction in reliability of the operation of touch devices, display devices, and electronic devices.

The information disclosed in this background section is only for enhancement of understanding of the background of the described technology and therefore it may contain information that does not form the prior art that is already known to a person of ordinary skill in the art.

SUMMARY

Various embodiments of the present disclosure are directed to a touch system and display device capable of recognizing touches with improved reliability.

An embodiment of the present disclosure may provide a touch system including: a touch array including a plurality of touch electrodes; a touch driver configured to apply touch driving signals including different codes to the touch electrodes to thereby transmit uplink signals to a plurality of objects adjacent to the touch array through the touch electrodes; at least one sub-host connected to at least one object among the plurality of objects through a communication channel, and configured to receive, from the at least one object, position information corresponding to the at least one object through the communication channel; and a main host configured to receive the position information corresponding to the at least one object among the plurality of objects through the at least one sub-host.

The at least one sub-host may include a first sub-host configured to receive first position information from a first object among the plurality of objects, and a second sub-host configured to receive second position information from a second object among the plurality of objects.

The first sub-host may further receive third position information from a third object among the plurality of objects.

The main host may receive the first position information from the first sub-host and receive the second position information from the second sub-host.

The communication channel may include a radio communication channel based on Bluetooth communication.

The at least one sub-host may be connected to the main host through an additional communication channel and transmit position information corresponding to the at least one object to the main host through the additional communication channel.

Each of the plurality of objects may be configured to compute position information corresponding to the object, based on uplink signals received from touch electrodes adjacent to the object among the touch electrodes.

The uplink signals may include digital components representing the different codes and include analog components depending on capacitances generated between the touch electrodes and the plurality of objects.

The touch driver may transmit the uplink signals in a first period. The at least one sub-host may receive the position information corresponding to the at least one object in a second period after the first period.

The touch driver may receive a downlink signal from a remaining object among the plurality of objects through at least some of the touch electrodes. The main host may acquire position information corresponding to the remaining object based on the downlink signal.

The touch electrodes may include driving electrodes extending in a first direction, and sensing electrodes extending in a second direction intersecting with the first direction. The uplink signals may be transmitted through the driving electrodes and the sensing electrodes.

The at least one sub-host may further receive object status information from the at least one object and transmit the object status information to the main host.

An embodiment of the present disclosure may provide a display device, including: a display panel including a plurality of pixels; a display driver configured to drive the plurality of pixels; a touch array including a plurality of touch electrodes; a touch driver configured to apply touch driving signals including different codes to the touch electrodes to thereby transmit uplink signals to a plurality of objects adjacent to the touch array through the touch electrodes; at least one sub-host connected to at least one object of the plurality of objects through a communication channel, and configured to receive, from the at least one object, position information corresponding to the at least one object through the communication channel; and a main host configured to receive the position information corresponding to the at least one object among the plurality of objects through the at least one sub-host.

The main host may generate image information based on position information corresponding to the at least one object and provide the image information to the display driver.

The at least one sub-host may include a first sub-host configured to receive first position information from a first object among the plurality of objects, and a second sub-host configured to receive second position information from a second object among the plurality of objects.

The first sub-host may further receive third position information from a third object among the plurality of objects.

The main host may receive the first position information from the first sub-host and receive the second position information from the second sub-host.

DETAILED DESCRIPTION

Embodiments of the present disclosure are described in detail below with reference to the attached drawings. In the following description embodiments, features and components useful for understanding of operations in accordance with the present disclosure are described, but explanation of the other features or components may be omitted to avoid making the present disclosure unclear. The present disclosure is not limited to the embodiments set forth herein but may be embodied in other ways. Accordingly, the description of specific embodiments are provided so that the present disclosure will be thorough and complete and will convey the technical spirit of the disclosure to those skilled in the art.

It will be understood that when an element is referred to as being "coupled" or "connected" to another element, the element can be directly coupled or connected to the other element or indirectly coupled or connected to the other element with intervening elements therebetween. The terminology used herein is for the purpose of describing particular embodiments only and is not intended to be limiting. In the specification, when an element is referred to as "comprising" or "including" a component, it does not preclude another component but may further include other components unless the context clearly indicates otherwise. The phrases "at least one of X, Y, and Z" and "at least one selected from the group consisting of X, Y, and Z" may be construed as X only, Y only, Z only, or any combination of two or more of X, Y, and Z (for instance, XYZ, XYY, YZ, and ZZ). As used herein, the term "and/or" can include any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Figure 1:
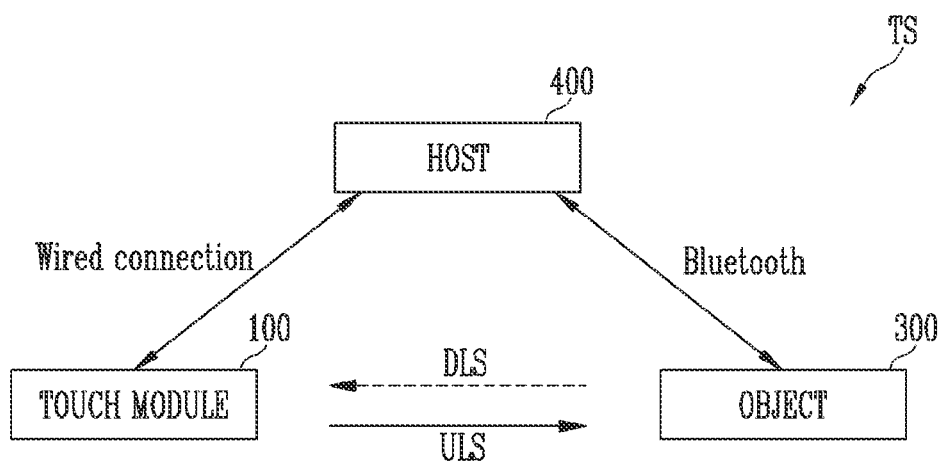
FIG. 1 is a block diagram illustrating a touch system according to an embodiment of the present disclosure.

FIG. 1 is a block diagram illustrating a touch system TS according to an embodiment of the present disclosure.

Referring to FIG. 1, the touch system TS may include a touch module 100, an object 300, and a host 400.

Figure 2:
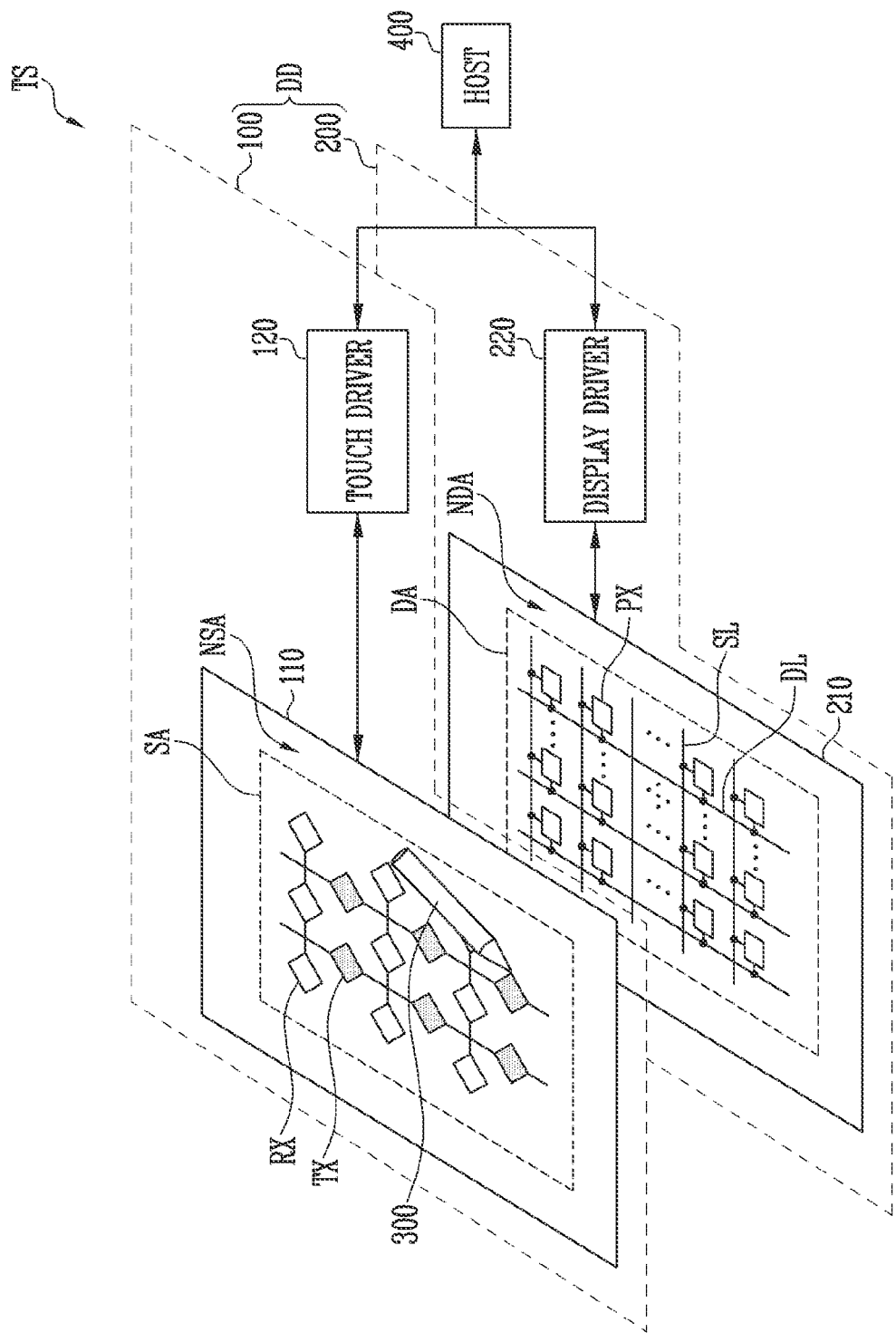
FIG. 2 is a block diagram illustrating an embodiment of the touch system of FIG. 1.

The touch module 100 may include a touch array 110 and a touch driver 120 as shown in FIG. 2. The touch driver 120 may transmit uplink signals ULS to the object 300 through touch electrodes disposed in the touch array 110. For example, the uplink signals ULS may be transmitted to the object 300 through capacitors or capacitive couplings formed between the touch electrodes of the touch array 110 and the object 300. In detail, the uplink signals ULS may be transmitted in a capacitive coupling scheme using an electric field.

The uplink signals ULS may be signals that include information about the touch array 110 and a display panel 210, protocol version information, and information about a vertical synchronization signal Vsync, and the like. The object 300 may specifically acquire information about the vertical synchronization signal Vsync from the uplink signals ULS and may determine a time point for transmitting downlink signals DLS. Furthermore, the object 300 may verify information about the touch array 110 and the display panel 210 or the version of the protocol from the uplink signals ULS.

Although FIG. 1 illustrates that the object 300 is a single object, the object 300 is not limited thereto. The object 300 may include various external devices, including an active pen, a robot, various accessories, a game card, and so on. The object 300 may be directly connected to the host 400 through a communication channel. Alternatively, the object 300 may be connected to the host 400 through the touch module 100 connected to the host 400 through a communication channel.

The object 300 may generate downlink signals DLS and transmit the downlink signals DLS to the touch module 100. Thereafter, the host 400 may acquire information about the object 300, based on the downlink signals DLS. Here, the downlink signals DLS may include position information corresponding to the object 300 and status information of the object 300 that the object 300 may have computed from the transmitted uplink signals. In detail, in the case where the object 300 is an active pen, the object status information may include information about intensity, pressure, inclination, and the like related to the active pen when the active pen comes into contact with the touch array 110. The object status information may further include one or more pieces of additional information such as button information, battery information, information about error check and correction, and the like for the active pen.

The touch module 100 may receive the downlink signals DLS through the touch array 110. The touch module 100 may decode the downlink signals DLS and extract the position information, the object status information and various additional information corresponding to the object 300. The touch module 100 may transmit the extracted position information, the object status information, and the various additional information to the host 400. In some embodiments, the touch module 100 and the host 400 may be electrically connected and may perform wired communication between each other. In some embodiments, the touch driver 120 and the host 400 may perform radio communication therebetween.

FIG. 1 illustrates an example in which the host 400 is a single component, but the host 400 may include a main host and a plurality of sub-hosts. In this case, the main host and the sub-hosts may be connected to each other through communication channels. For example, the main host of the host 400, along with the touch module 100, may be implemented as a computing device such as a computer, a laptop, a smartphone, or a wearable device. On the other hand, each of the sub-hosts of the host 400, along with the object 300, may be implemented as a separate computing device such as a computer, a laptop, a smartphone, or a wearable device.

The host 400 may include an internal memory, one or more processors, and an interface. The host 400 may execute various software programs through the processors to perform various functions for the touch system TS and may perform processing and control for data communication. Furthermore, the host 400 may communicate with various external devices and/or systems through various interfaces. For example, the touch system TS may perform communication between the touch module 100 and the object 300 through the host 400. For example, the host 400 may include a transmission device that can perform or employ both a wired communication method for direct connection using a serial bus (I2C), a universal serial bus (USB), a serial peripheral interface (SPI), or RS-232 and a wireless or radio communication method for connection using Bluetooth (low-energy Bluetooth), WiFi direct, IrDA LAN, and WAN. The host 400 may perform communication through the transmission device.

In an embodiment, the touch system TS may transmit uplink signals ULS from the touch module 100 to the object 300. The object 300 may receive the uplink signals ULS. The object 300 may compute position information corresponding to the object 300 using the uplink signals ULS. The object 300 may transmit the computed position information corresponding to the object 300 to the touch module 100 through downlink signals DLS or directly to the host 400, e.g., using a Bluetooth protocol.

FIG. 2 is a block diagram illustrating an embodiment including the host 400 of the touch system TS of FIG. 1 and a display device DD. Referring to FIG. 2, the display device DD may include embodiments of the touch module 100 and a display module 200. The touch module 100 may include a touch array 110, and a touch driver 120 configured to drive the touch array 110. The display module 200 may include a display panel 210, and a display driver 220 configured to drive the display panel 210.

In some embodiments, the touch array 110 and the display panel 210 may be manufactured separately from each other and may be coupled to each other to at least partially overlap each other. In some embodiments, the touch array 110 and the display panel 210 may be manufactured as a single body or integrated structure. In this case, the touch array 110 may be directly formed on at least one layer, which forms the display panel 210, for example, on an upper substrate, a thin film encapsulation layer, or an insulating layer of the display panel 2110.

FIG. 2 shows an example where the touch array 110 is disposed over or above the display panel 210, but the touch array 110 is not limited thereto. For instance, the touch array 110 may be disposed under the display panel 210.

The touch array 110 may include a sensing area SA capable of sensing a touch, and a non-sensing area NSA formed around the sensing area SA. The sensing area SA may at least partially overlap a display area DA of the display panel 210. The display device DD may not only display an image through the sensing area SA but may also sense touch input made on the display surface or sense light that is incident on a front of the display surface. Although the non-sensing area NSA may enclose the sensing area SA, the aforementioned example is only for illustrative purposes, and the present disclosure is not limited thereto.

The touch array 110 may include a substrate, and driving electrodes TX and sensing electrodes RX that are formed on the substrate. The driving electrodes TX and the sensing electrodes RX may be disposed in the sensing area SA on the substrate. In some embodiments, the substrate of the touch array 110 may be a rigid substrate including material such as glass or reinforced glass. In some embodiments, the substrate of the touch array 110 may be a flexible substrate including material such as plastic or metal. In some embodiments, at least one layer which forms the display panel 210 may be used as a substrate of the touch array 110.

The display panel 210 may include the display area DA and a non-display area. The display may display an image, and the non-display area NDA may be provided around the display area DA. The non-display area NDA may at least partially enclose or surround the display area DA. The display panel 210 may include pixels PX in the display area DA, which are formed in or on a substrate. In some embodiments, the substrate of the display panel 210 may be a rigid substrate including material such as glass or reinforced glass. In some embodiments, the substrate of the display panel 210 may be a flexible substrate including material such as plastic or metal.

The pixels PX may be connected to scan lines SL and data lines DL. The pixels PX may be selected using driving signals supplied through the scan lines SL and may receive data signals through the data lines DL. Hence, the pixels PX may emit light with luminance corresponding to the data signals so that an image is displayed in the display area DA.

Lines and/or circuits which are connected to the pixels PX may be disposed in the non-display area NDA. For example, an additional scan driver may be disposed in the non-display area NDA.

In some embodiments, the display panel 210 may include organic light emitting diodes, inorganic light emitting diodes, quantum dot/well light emitting diodes, or the like, as light emitting elements in the pixels PX. In embodiments, the display panel 210 may be implemented as a liquid crystal display panel. In this case, an additional light source such as a back-light unit may be provided.

In some embodiments, the touch driver 120 and the display driver 220 may be formed in separate integrated chips (ICs). In some embodiments, the touch driver 120 and the display driver 220 may be integrated in a single IC.

The touch driver 120 may operate under the control of the host 400. The touch driver 120 may be connected to the touch array 110 to drive the touch array 110. Further information regarding an embodiment of the touch array 110 and the touch driver 120 is provided below with reference to FIG. 4.

The display driver 220 may operate under the control of the host 400. The display driver 220 may be electrically connected to the display panel 210 to drive the pixels PX. Further information regarding embodiments of the display driver 220 and the display panel 210 is provided below with reference to FIG. 3.

The host 400 may be connected to the touch driver 120 and the display driver 220. The host 400 may be configured to control overall operations of the touch driver 120 and the display driver 220. In some embodiments, the touch driver 120 may receive a downlink signal DLS from the object 300 and transmit the downlink signal DLS to the host 400. The host 400 may acquire position information of the object 300 on the touch array 110 from the downlink signal DLS. In some embodiments, the host 400 may be connected to the object 300 through a communication channel. The host 400 may receive the position information on the touch array 110 from the object 300 through the communication channel.

The display device DD may be employed in electronic devices such as a computer, a laptop, a cellular phone, a smart phone, a personal digital assistants (PDA), a potable multimedia player (PMP), a digital TV, a digital camera, a potable game console, a navigation device, a wearable device, an internet of tings (IoT) device, an internet of everything (IoE) device, an e-book, a virtual reality (VR) device, an augmented reality (AR) device, a navigation device for vehicles, a videophone, a monitoring system, an automatic focus system, a tracking system, and a motion sensor system.

Figure 3:
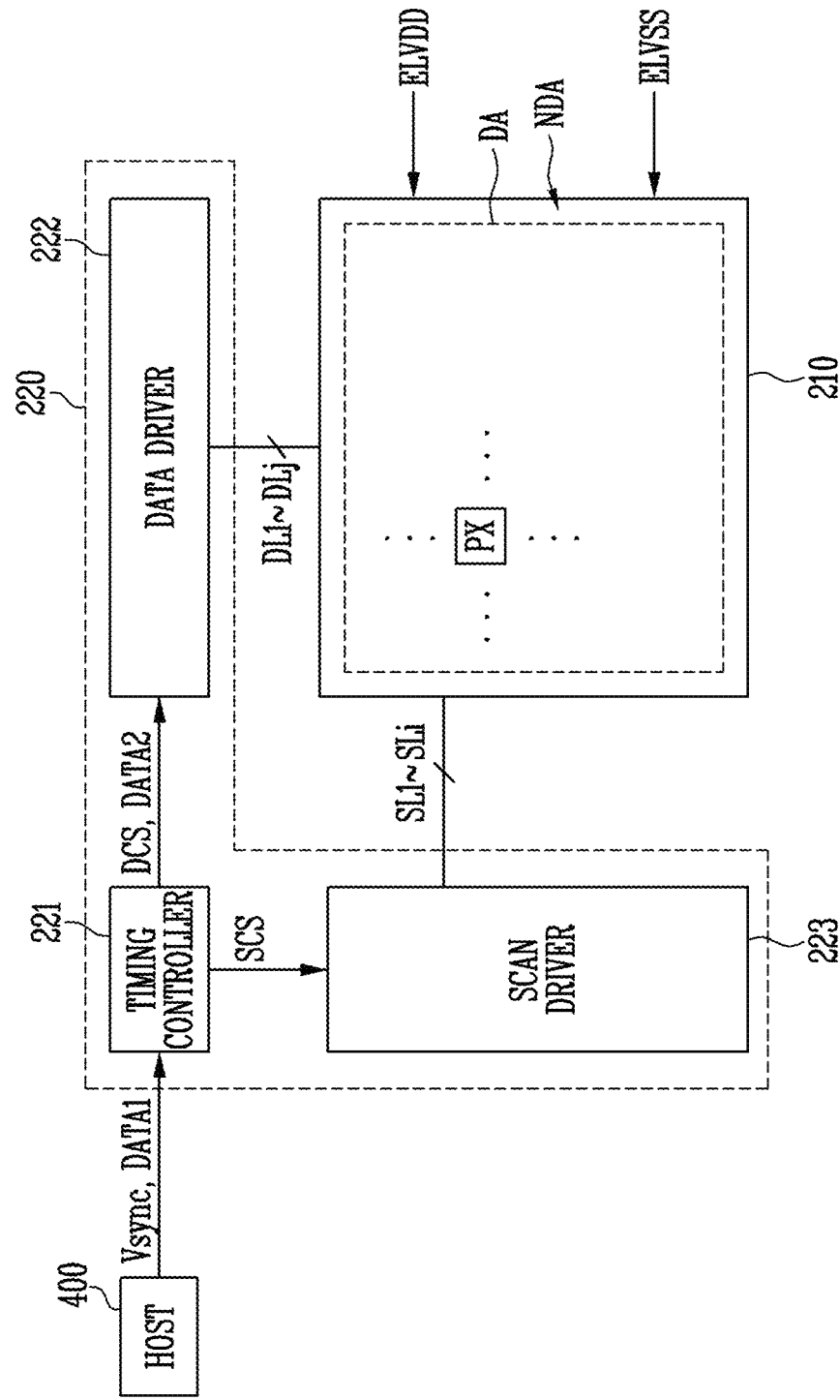
FIG. 3 is a block diagram illustrating an embodiment of a display module of FIG. 2.

FIG. 3 is a block diagram illustrating an embodiment of a display module of FIG. 2.

Referring to FIG. 3, the display module 200 may include a display panel 210 and a display driver 220. The display driver 220 may include a timing controller 221, a data driver 222, and a scan driver 223.

The host 400 may provide image data DATA1 to the display module 200. In some embodiments, the host 400 may include an application processor, a central processing unit (CPU), and the like to control the display module 200. In some embodiments, the host 400 may include a graphic processing unit (GPU) to control the display module 200. In addition, the host 400 may include at least one of various devices configured to provide the image data DATA1 to the display module 200. The host 400 may receive the position information corresponding to the object 300 on the touch array 110 and may perform various operations using the received position information.

The timing controller 221 may generate control signals to control the data driver 222 and the scan driver 123 using an external input signal received from the host 400. For example, the control signals generated may include a scan driver control signal SCS for controlling the scan driver 123 and a data driver control signal DCS for controlling the data driver 222. The external input signal input from the host 400 may include signals such as a data enable signal, and a vertical synchronization signal Vsync, in addition to a signal indicating the position information corresponding to the object 300 on the touch array 110. Particularly, the vertical synchronization signal Vsync may be a signal used to synchronize image data and may be a signal input on a frame cycle to distinguish frames. However, embodiments are not limited to the aforementioned example. For example, the vertical synchronization signal Vsync may be generated internally from the timing controller 221. For example, the timing controller 221 may include a logic circuit configured to generate the vertical synchronization signal Vsync based on a signal such as the data enable signal or the like received from the host 400.

In some embodiments, the vertical synchronization signal Vsync may be provided to the touch driver 120 of FIG. 2. The touch driver 120 may generate uplink signals ULS (refer to FIG. 1) in synchronization with the vertical synchronization signal Vsync.

The timing controller 221 may supply the scan driver control signal SCS to the scan driver 223 and supply the data driver control signal DCS to the data driver 222. The timing controller 221 may translate first image data DATA1 received from an external device, e.g., the host 400, into second image data DATA2 corresponding to the specifications of the data driver 222 and then supply the second image data DATA2 to the data driver 222.

In an embodiment, the display panel 210 may include pixels PX, and data lines DL1 to DLj and scan lines SL1 to SLi connected to the pixels PX. Here, j and i each is a natural number greater than 1.

The data driver 222 may use the data driver control signal DCS and second image data DATA2 received from the timing controller 221 to generate data signals. The data driver 222 may supply the generated data signals to the data lines DL1 to DLj. For connection with the data lines DL1 to DLj, the data driver 222 may be directly mounted on the substrate on which the pixels PX reside or may be connected to the substrate by a separate component such as a flexible circuit board.

The scan driver 223 may supply scan signals to the scan lines SL1 to SLi in response to a scan driver control signal SCS. For example, the scan driver 223 may sequentially supply or assert scan signals to the scan lines SL1 to SLi. For connection with the scan lines SL1 to SLi, the scan driver 223 may be directly mounted on the substrate on which the pixels PX reside or may be connected to the substrate by a separate component such as a flexible circuit board.

The scan signals may select which pixels PX emit light. For example, if a scan signal is supplied or asserted to one of the scan lines, the pixels PX connected to that scan line may receive data signals respectively transmitted from the corresponding data lines DL1 to DLj. Thus, those pixels PX may emit light with luminance corresponding to the received data signals.

FIG. 3 illustrates an example in which the timing controller 221, the data driver 222, and the scan driver 223 are separately provided, but at least some of the foregoing components may be integrated with each other, as needed.

An electrode to which a voltage and/or signal to drive the display panel 210 is supplied may be referred to as a panel electrode. The panel electrode may be the data lines DL1 to DLj, the scan lines SL1 to SLi, a first power supply ELVDD, a second power supply ELVSS, and the like. A driving voltage may be supplied to the panel electrode. For example, each of the pixels PX may generate light corresponding to a data signal by current flowing from the first power supply ELVDD to the second power supply ELVSS via the light emitting element in the pixel PX. The first power source ELVDD may have a high potential voltage, and the second power source ELVSS may have a low potential voltage.

Figure 4:
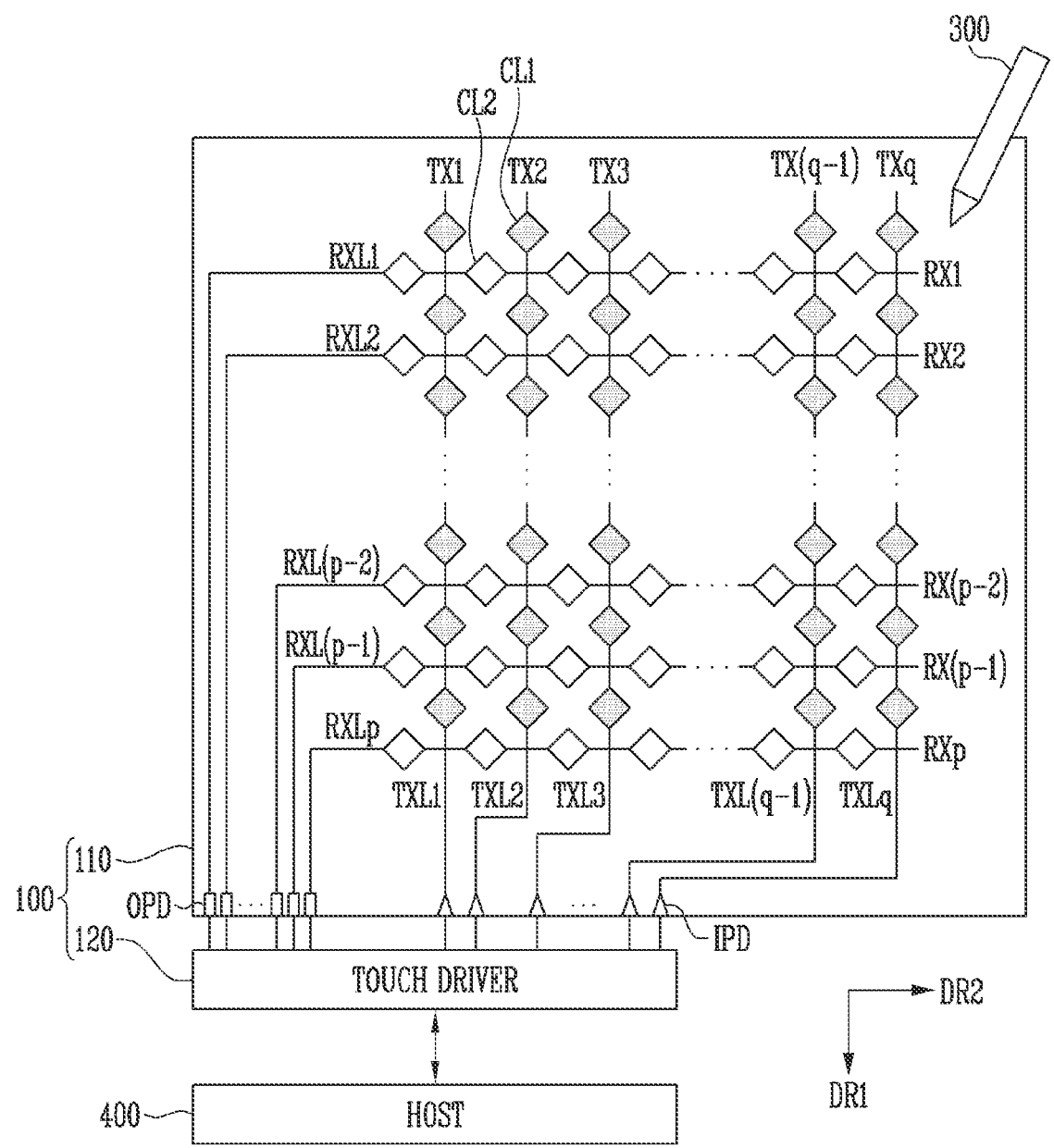
FIG. 4 is a block diagram illustrating an embodiment of a touch module of FIG. 1.

FIG. 4 is a block diagram illustrating an embodiment of the touch module 100 of FIG. 1.

Referring to FIG. 4, the touch electrodes of the touch array 110 may include first to q-th touch electrodes TX1 to TXq and first to p-th sensing electrodes RX1 to RXp. The first to q-th driving electrodes TX1 to TXq may extend in the first direction DR1 and may be spaced apart from each other in the second direction DR2. The first to p-th sensing electrodes RX1 to RXp may extend in the second direction DR2 and may be spaced apart from each other in the first direction DR1. The first to p-th sensing electrodes RX1 to RXp may be electrically separated from the first to q-th driving electrodes TX1 to TXq while crossing (over or under) the first to q-th driving electrodes TX1 to TXq, thus forming mutual capacitances with the first to q-th driving electrodes TX1 to TXq. Here, the mutual capacitances may vary when a user touches the touch array 110. For example, the touch on the touch array 110 may include at least one of various types of inputs that cause a change in mutual capacitance such as the user physically contacting the touch array 110 or the user hovering over the touch array 110.

The first to q-th driving electrodes TX1 to TXq may be respectively connected to first to q-th driving lines TXL1 to TXLq. The first to p-th sensing electrodes RX1 to RXp may be respectively connected to first to p-th sensing lines RXL1 to RXLp. In this case, the first to q-th driving electrodes TX1 to TXq may be provided as the driving electrodes TX of FIG. 2. The first to p-th sensing electrodes RX1 to RXp may be provided as the sensing electrodes RX of FIG. 2.

Each of the first to q-th driving electrodes TX1 to TXq may include first cells CL1 that are arranged along the first direction DR1 and electrically connected to each other. Each of the first to p-th sensing electrodes RX1 to RXp may include second cells CL2 that are arranged along the second direction and electrically connected to each other. In FIG. 4, each of the first cells CL1 and the second cells CL2 is illustrated as having a diamond shape. Here, the diamond shape is only illustrative, and at least one of various shapes such as circular, rectangular, triangular, and mesh, may be used. Furthermore, each of the first cells CL1 and the second cells CL2 may be formed as a single layer or multiple layers. As such, the shapes and the arrangements of the first to q-th driving electrodes TX1 to TXq and the first to p-th sensing electrodes RX1 to RXp may be modified in various ways.

In some embodiments, the first cells CL1 and the second cells CL2 may include at least one of various conductive materials such as metals, metallic materials, transparent materials, and the like, thus ensuring conductivity. For example, the first cells CL1 and the second cells CL2 may include at least one of various metallic materials such as gold (Au), silver (Ag), aluminum (Al), molybdenum (Mo), chromium (Cr), titanium (Ti), nickel (Ni), neodymium (Nd), copper (Cu), and platinum (Pt), or an alloy thereof.

The touch array 110 of FIG. 4 may be used as the touch array 110 of FIG. 2.

The touch array 110 may further include input pads IPD connected to the first to q-th driving lines TXL1 to TXLq. The touch driver 120 may be connected to the first to q-th driving lines TXL1 to TXLq through the input pads IPD. The touch array 110 may further include output pads OPD connected to the first to p-th sensing lines RXL1 to RXLp. The touch driver 120 may be connected to the first to p-th sensing lines RXL1 to RXLq through the output pads OPD.

The touch driver 120 may generate touch driving signals representing different codes and may apply touch driving signals to the touch electrodes of the touch array 110 and thus transmit uplink signals to the object 300 adjacent to the touch array 110. The touch driver 120 may apply touch driving signals to the first to q-th driving electrodes TX1 to TXq through the first to q-th driving lines TXL1 to TXLq, thus transmitting uplink signals to the object 300. The touch driver 120 may apply touch driving signals to the first to p-th sensing electrodes RX1 to RXp through the first to p-th sensing lines RXL1 to RXLp, thus transmitting uplink signals to the object 300.

Referring to FIGS. 1 and 4, the touch module 100 may transceive signals with the object 300 through the first to q-th driving electrodes TX1 to TXq and the first to p-th sensing electrodes RX1 to RXp. For example, the touch driver 120 may supply touch driving signals to the first to q-th driving electrodes TX1 to TXq and the first to p-th sensing electrodes RX1 to RXp of the touch array 110, thus transmitting the uplink signals ULS to the object 300.

In the case where the object 300 is in contact or proximity with the touch array 110, the object 300 may receive the uplink signals ULS through at least some of the first to q-th driving electrodes TX1 to TXq and the first to p-th sensing electrodes RX1 to RXp. The object 300 may decode the received uplink signals ULS to compute position information corresponding to the object 300 and indicating the position of the object 300 relative to the touch array 110.

The touch driver 120 may receive an external input signal including various control signals from the host 400. The touch driver 120 may receive the downlink signal DLS through the touch array 110. The downlink signal DLS may include the position information corresponding to the object 300. The touch driver 120 may extract the position information corresponding to the object 300 from the downlink signal DLS and transmit the extracted position information to the host 400. Alternatively, the touch driver 120 may transmit the downlink signal DLS to the host 400, and the host 400 may extract the position information corresponding to the object 300 based on a signal from the touch driver 120.

Figure 5:
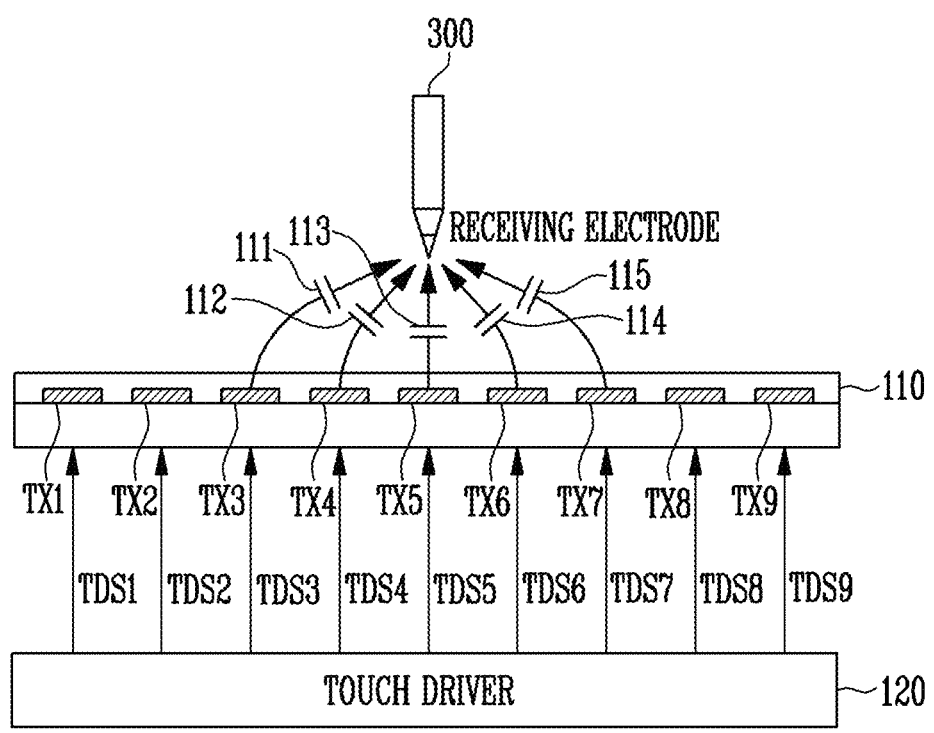
FIG. 5 is a diagram for describing uplink signals received by an object of FIG. 1.

FIG. 5 is a diagram for describing uplink signals that the object 300 of FIG. 1 receives.

Referring to FIG. 5, an operation in which the object 300 receives uplink signals through capacitors or capacitances formed between the object 300 and adjacent touch electrodes can be explained. Although FIG. 5 illustrates that the object 300 is an active pen, the present disclosure is not limited thereto.

As illustrated in FIG. 5, the touch driver 120 may apply respective touch driving signals TDS1 to TDS9 including different codes to the first to ninth driving electrodes TX1 to TX9 of the touch array 110. If the object 300 is adjacent to the touch array 110, the object 300 may receive uplink signals through capacitive couplings or capacitors 111 to 115 generated between the object 300 and the third to seventh driving electrode TX3 to TX7, which are the driving electrodes adjacent or closest to the object 300.

The uplink signals may include digital components indicating different codes and analog components depending on the capacitors or capacitances generated between the touch electrodes and the object 300. For example, each of the uplink signals transmitted from the third to seventh touch electrodes TX3 to TX7 may include a digital component corresponding to the related touch driving signal and an analog component corresponding to the related capacitor or capacitance 111 to 115.

The object 300 may compute the position information corresponding to the object 300 based on the uplink signals received from the third to seventh touch electrodes TX3 to TX7. For example, the object 300 may identify or distinguish uplink signals from different touch electrodes TX3 to TX7 and may determine weights for the respective uplink signals, based on the analog components corresponding to the capacitors 111 to 115. The object 300 may apply the determined weights to the respective uplink signals. The object 300 may compute the position information corresponding to the object 300 by decoding the uplink signals with the applied weights and/or the digital components thereof. Here, a decoding process may be applied to decode the uplink signals and/or the digital components thereof. As such, the object 300 may determine the position information of the object 300, based on an uplink signal received from at least one touch electrode adjacent to the object 300.

In FIG. 5, the first to ninth driving electrodes TX1 to TX9 may be some components of the touch array 110 of FIG. 4, and the remaining touch electrodes are omitted from FIG. 5 for clarity of illustration and explanation. However, the aforementioned example is just an example, and the same description may also be applied to the case where uplink signals are transmitted through other touch electrodes (e.g., the sensing electrodes RX).

Figure 6:
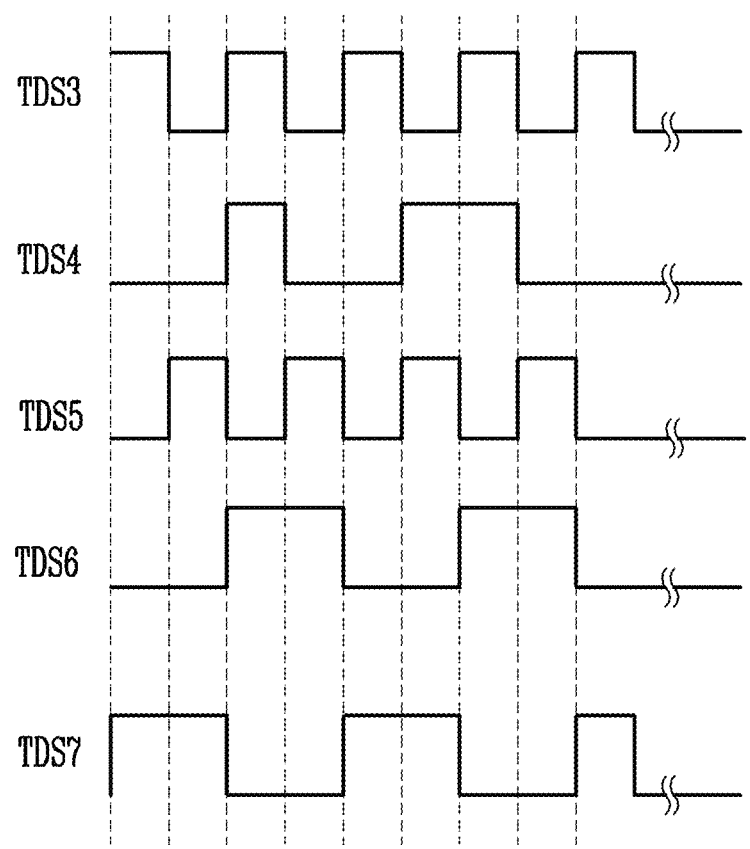
FIG. 6 is a timing diagram illustrating an example of a touch driving signal applied to each touch electrode of FIG. 5.

FIG. 6 is a timing diagram illustrating an example of a touch driving signal applied to each touch electrode TX3 to TX7 of FIG. 5.

Referring to FIG. 6, the illustrated touch driving signals TDS3 to TDS7 may be respectively applied to the third to seventh driving electrodes TX3 to TX7 to which the object 300 of FIG. 5 is adjacent. The touch driving signals may be signals generated by encoding based on different codes and modulating based on the encoding. Therefore, the touch driving signals may include digital components. The touch driving signals may be generated as signals having various waveforms such as pulses, sinusoidal waves, and triangular waves.

In an embodiment, the touch driving signals may be pulse signals in different forms including 1 or 0 amplitude levels in a plurality of bit columns or time windows. For example, the touch driving signal TDS3 applied to the third driving electrode TX3 may be a signal of a digital component including 101010101, which may be represented by a high level in first, third, fifth, seventh, and ninth bit columns or time windows and a low level in second, fourth, sixth, and eighth bit columns or time windows. The touch driving signal TDS4 applied to the fourth driving electrode TX4 may be a signal of a digital component including 001001100. The touch driving signal TDS5 applied to the fifth driving electrode TX5 may be a signal of a digital component including 010101010. The touch driving signal TDS6 applied to the sixth driving electrode TX6 may be a signal of a digital component including 001100110. The touch driving signal TDS7 applied to the seventh driving electrode TX7 may be a signal of a digital component including 110011001. However, it should be noted that the aforementioned description of the touch driving signals including different codes is only for the sake of example, and the present disclosure is not limited thereto.

Figure 7:
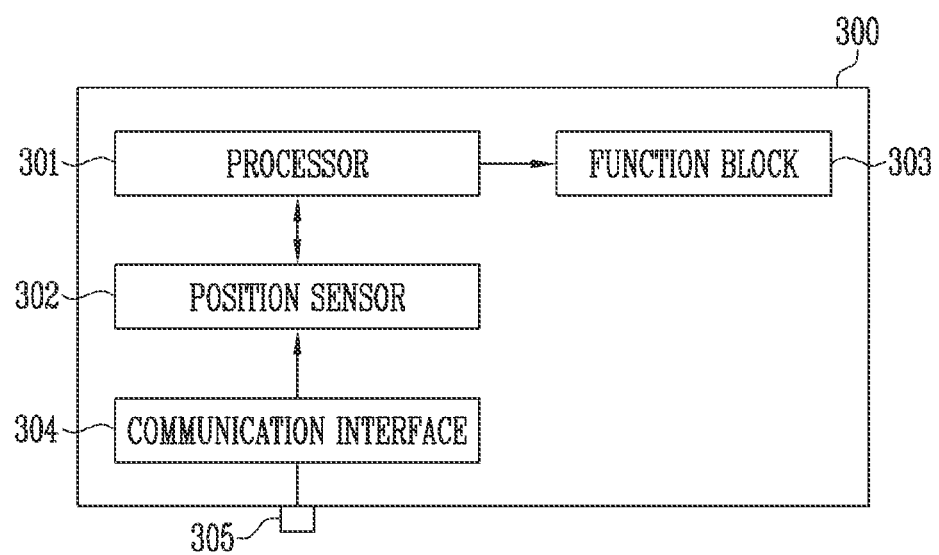
FIG. 7 is a block diagram illustrating an embodiment of the object of FIG. 1.

FIG. 7 is a block diagram illustrating an embodiment of the object 300 of FIG. 1.

Referring to FIG. 7, the object 300 may include a processor 301, a position sensor 302, a function block 303, a communication interface 304, and a receiving electrode 305.

In some embodiments, the object 300 may be an external device such as an active pen, a robot, various accessories, and a game card.

The processor 301 may be configured to control overall operations of the object 300. For example, the processor 301 may control the position sensor 302. The processor 301 may transmit a position sensor control signal to the position sensor 302 to control the operation of the position sensor 302. The position sensor 302 may decode uplink signals received from the communication interface 304 to compute the position information corresponding to the object 300.

The processor 301 may receive the position information from the position sensor 302 and transmit the received position information to the function block 303. The function block 303 may perform various functions using the received position information. For example, the function block 303 may include a motor to move the object 300 in a specific direction. In this case, the function block 303 may drive the motor to move the object 300 according to the receive position information.

In some embodiments, the processor 301 may control a position sensor 302 and the communication interface 304 to transmit to the touch module 100 a downlink signal indicating the position information. In this case, the position sensor 302 may encode the position information corresponding to the object 300 and provide the encoded position information to the communication interface 304. The communication interface 304 may transmit downlink signals including the data signal with the encoded position information to the touch array 110 through the receiving electrode 305.

The receiving electrode 305 of the object 300 may be connected to the communication interface 304. In the case where the receiving electrode 305 is adjacent to the touch array 110, a relatively low capacitor or capacitive coupling may be arise between the receiving electrode 305 and at least some of the driving electrodes TX and the sensing electrodes RX. In this case, the object 300 may communicate an uplink signal and/or downlink signal with the corresponding driving electrode and/or sensing electrode through the relatively low capacitor or capacitive coupling.

The communication interface 304 may amplify the received signal. For example, the communication interface 304 may amplify a signal received through the receiving electrode 305 during a process of receiving the uplink signal. The communication interface 304 may also amplify a signal received from the position sensor 302 during a process of transmitting the downlink signal.

The communication interface 304 may be configured to convert an analog signal into a digital signal and to convert a digital signal into an analog signal. For example, the communication interface 304 may convert uplink signals received through receiving electrode 305 into digital signals and provide the digital signals to the position sensor 302. For example, the communication interface 304 may convert the digital signals received from the position sensor 302 into downlink signals and output the downlink signals through the receiving electrode 305.

The touch module 100 may receive the downlink signals through touch electrodes adjacent to the receiving electrode 305 among the driving electrodes TX and the sensing electrodes RX.

Figure 8:
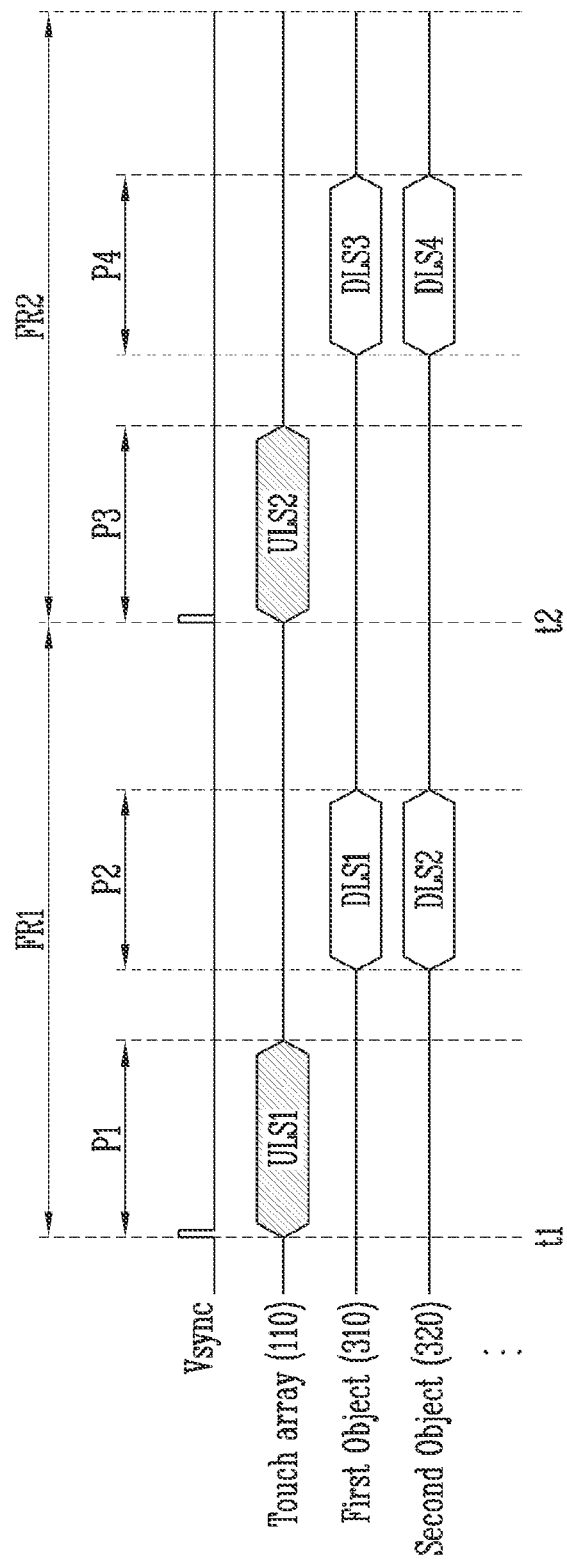
FIG. 8 is a timing diagram illustrating an embodiment of a process for transmitting uplink signals and receiving position information.

FIG. 8 is a timing diagram illustrating an embodiment of transmitting uplink signals and receiving position information. FIG. 8 particularly shows two frame periods FR1 and FR2 out of a series of frame periods. Referring to FIGS. 2 and 8, each frame period may include a transmission period for transmitting uplink signals and a receiving period for receiving downlink signals.

The display device DD such as shown in FIG. 2 may operate in units of frames periods FR, which are divided from each other by the vertical synchronization signal Vsync. The vertical synchronization signal Vsync may toggle on a certain cycle. The cycle of the vertical synchronization signal Vsync may correspond to the cycle of the frame period FR, which may also be used for video display. For example, a first time point t1 may be a time point at which the vertical synchronization signal Vsync makes a transition to a high level and may correspond to a time point at which the first frame period FR1 starts. A second time point t2 may be a time point at which the vertical synchronization signal Vsync again makes a transition to the high level and may correspond to a time point at which the second frame period FR2 starts.

In an embodiment, the first frame period FR1 may include a first period P1 for transmitting an uplink signal and a second period P2 for receiving a downlink signal. The second frame period FR2 may include a third period P3 for transmitting an uplink signal and a fourth period P4 for receiving a downlink signal. Furthermore, the first period P1 for transmitting an uplink signal may be a sensing period before a display period but is not limited thereto.

The touch driver 120 may receive the vertical synchronization signal Vsync. The touch driver 120 may transmit an uplink signal in each frame period in response to the vertical synchronization signal Vsync. Alternatively, the host 400 may control the touch driver 120 to allow the touch driver 120 to transmit an uplink signal in response to the vertical synchronization signal Vsync.

In some embodiments, in the first frame period FR1, the host 400 may transmit the first uplink signals ULS1 from the touch array 110 through the touch driver 120 during the first period P1. Any objects sufficiently close to the touch array 110 may receive the first uplink signals ULS1, and FIG. 8 shows an example including multiple objects. In particular, each of a first object 310 and a second object 320 may receive the first uplink signals ULS1 from the touch array 110. Each of the first object 310 and the second object 320 may compute its corresponding position information using the received first uplink signals ULS1.

During the second period P2 after the first period P1, the host 400 may receive a first downlink signal DLS1 from the first object 310 through the touch array 110 and receive a second downlink signal DLS2 from the second object 320. Here, the first downlink signal DLS1 may include position information and object status information corresponding to the first object 310 during the first frame period FR1. Here, the second downlink signal DLS2 may include position information and object status information corresponding to the second object 320 during the first frame period FR1.

In the second frame period FR2, the host 400 may transmit second uplink signals ULS2 from the touch array 110 through the touch driver 120 during the third period P3. Each of the first object 310 and the second object 320 may receive the second uplink signals ULS2 from the touch array 110. Each of the first object 310 and the second object 320 may compute its corresponding position information using the received second uplink signals ULS2. Here, the second uplink signals ULS2 may be the same signals as the first uplink signals ULS1 but transmitted at a different time, but the embodiments are not limited thereto.

During the fourth period P4 after the third period P3, the host 400 may receive, through the touch array 110, a third downlink signal DLS3 from the first object 310 and a fourth downlink signal DLS4 from the second object 320. Here, the third downlink signal DLS3 may include position information and object status information corresponding to the first object 310 during the second frame period FR2. Here, the second downlink signal DLS2 may include position information and object status information corresponding to the second object 320 during the second frame period FR2.

Figure 9:
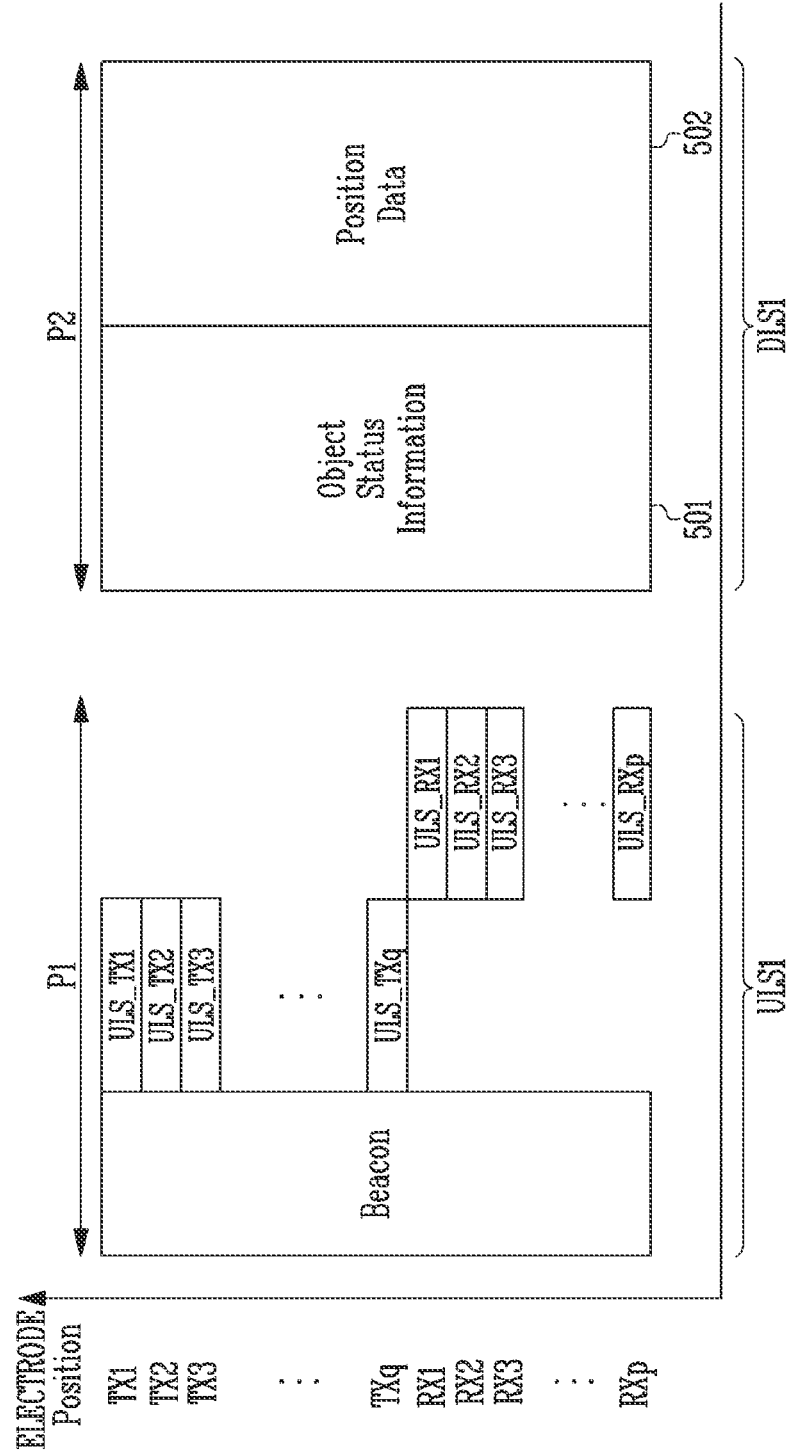
FIG. 9 is a timing diagram illustrating an example of an uplink signal transmitted from a touch array and a downlink signal transmitted from any one of objects.

FIG. 9 is a timing diagram illustrating an example of an uplink signal transmitted from a touch array and a downlink signal transmitted from one object.

Referring to FIGS. 8 and 9, communication between the touch module 100 and the object 300 may be performed on a frame period basis. Each frame period may include the first period P1 for the uplink signals ULS1 and the second period P2 for a downlink signal.

In FIG. 9, the first uplink signals ULS1 and the first downlink signal DLS1 of FIG. 8 are illustrated by way of example. However, the foregoing example is illustrative, and other uplink signals (e.g., ULS2) and other downlink signals (e.g., DLS3) may also be configured in the same manner.

As illustrated in FIGS. 1 and 9, the touch driver 120 may transmit the uplink signals ULS1 in the first period P1 and, after the first period P1, receive the downlink signal DLS1 in the second period P2. For example, the touch driver 120 may transmit the uplink signals ULS1 to the object 300 through the touch array 110 in the first period P1. In detail, the uplink signals ULS1 in the first period P1 may include uplink signals ULS_TX1, ULS_TX2, ULS_TX3, . . . , and ULS_TXq that are transmitted by the first to q-th driving electrodes TX1 to TXq, and uplink signals ULS_RX1, ULS_RX2, ULS_RX3, . . . , and ULS_RXp that are transmitted by the first to p-th sensing electrodes RX1 to RXp. After the first period P1, the object 300 may transmit the downlink signal DLS1, and the touch module 100 may receive the downlink signal DLS1 through the touch array 110 during the second period P2.

The uplink signals ULS1 may include a beacon signal Beacon. The beacon signal Beacon may be understood as a control signal to inform the object 300 that transmission of the uplink signals ULS1 starts. For example, the beacon signal Beacon may include a signal having a certain data pattern. In an embodiment, the beacon signal Beacon may further include identifier data corresponding to the touch module 100. The beacon signal Beacon may be modified in various ways or omitted depending on the embodiment.

The downlink signal DLS1 may include object status information 501 of the object 300 and position data 502 of the object 300. For example, the object status information 501 may indicate the status information of the object 300 and various additional information about the object 300 when the object 300 communicates with the touch array 110. Furthermore, the position data 502 may indicate information computed by the object 300 using the uplink signals ULS1.

The object 300 may transmit the object status information 501 and the position information 502 to the host 400 using a Bluetooth protocol or a Bluetooth low energy (BLE) protocol. In detail, the object 300 may transmit the object status information 501 and the position information 502 to the host 400 through the Bluetooth protocol during the second period P2 after the first period P1.

Figure 10:
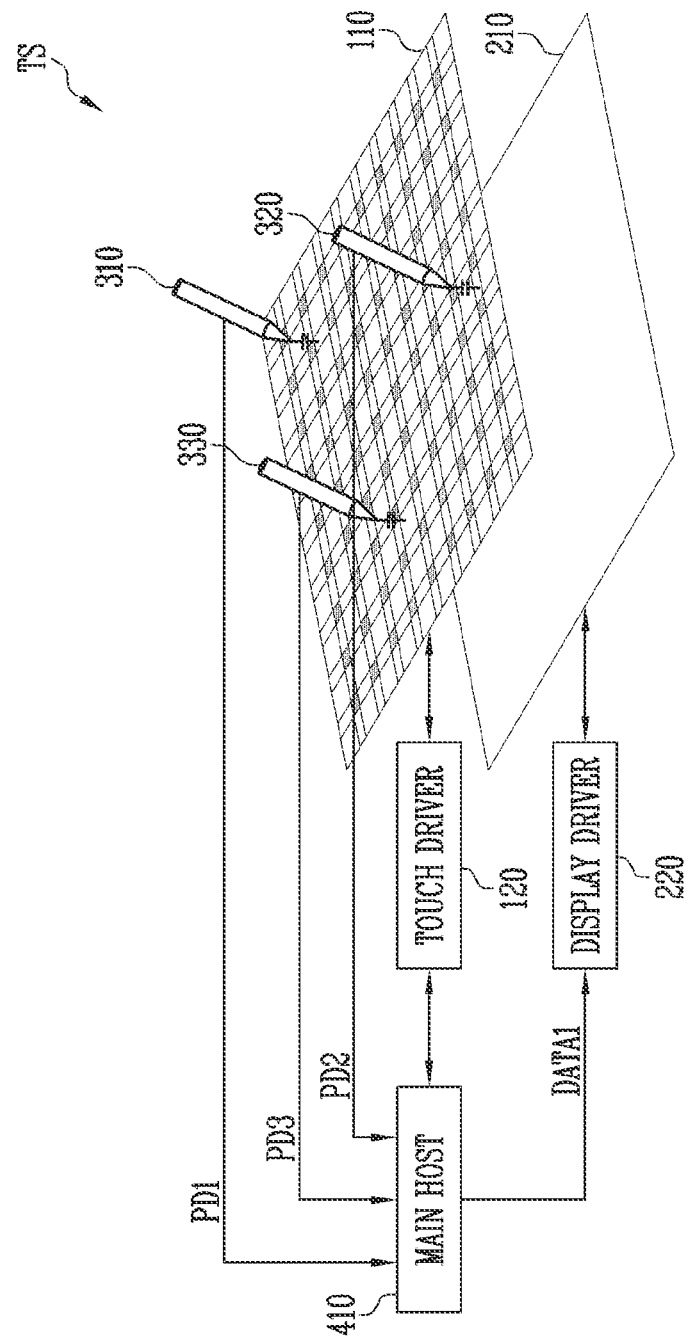
FIG. 10 is a block diagram illustrating an embodiment of the touch system of FIG. 2.

FIG. 10 is a block diagram illustrating an embodiment of the touch system TS of FIG. 2.

Referring to FIG. 10, the touch system TS in accordance with an embodiment of the present disclosure may include a touch array 110, a touch driver 120, and a main host 410 and may be configured to a plurality of objects 310 to 330. In this case, the host 400 of FIG. 1 may be employed as the main host 410. The display panel 210 and the display driver 220 may be as described for the display module 200 of FIG. 2. The touch array 110 and the touch driver 120 may be included in the touch module 100 of FIG. 2. The touch module 100 and the display module 200 may form a touch system TS along with the main host 410 and the plurality of objects 310 to 330.

In some embodiments, the main host 410 may control the operation of the display panel 210 through the display driver 220. For example, the main host 410 may input image data DATA1 to the display driver 220. The display driver 220 may synchronize the received image data DATA1 with control signals and supply data to the display panel 210. Thereby, the display panel 210 may display an image corresponding to the image data DATAL.

The main host 410 may control the touch driver 120 to apply touch driving signals including different codes to the touch electrodes of the touch array 110, thus allowing the touch driver 120 to output a plurality of uplink signals.

The main host 410 may be connected to each of the objects 310 to 330 through a corresponding communication channel. The main host 410 may receive, through the respective communication channels for the objects 310 to 330, position information corresponding to the respective objects 310 to 330. Each of these communication channels may be a radio communication channel based on Bluetooth communication. However, the types of communication channels are not limited to the aforementioned example.

In an embodiment, the main host 410 may receive first position information PD1 from the first object 310 through the Bluetooth communication. The main host 410 may receive second position information PD2 from the second object 320 through the Bluetooth communication. The main host 410 may receive third position information PD3 from the third object 330 through the Bluetooth communication. Although in FIG. 10 there are illustrated three objects 310, 320, and 330, the number of objects may be increased as needed.

The main host 410 may control the touch driver 120 and the display driver 220 based on the received position information corresponding to the respective objects 310 to 330. For example, the main host 410 may control the touch driver 120 to apply touch driving signals only to some touch electrodes with a high detection probability, based on the first position information PD1, the second position information PD2, and the third position information PD3. For instance, the main host 410 may control the display driver 220 to combine data representing the first position information PD1, the second position information PD2, and the third position information PD3 with the image data DATA1 and display the combined data.

The main host 410 may control the objects 310 to 330 based on the received position information corresponding to the respective objects 310 to 330. For example, the main host 410 may acquire movement information including a movement distance and movement direction of each of the first to third objects 310 to 330, based on the first to third position information PD1 to PD3. Particularly, in the case where each of the first to third objects 310 to 330 includes a motor for movement in a specific direction, the main host 410 may monitor movement of the first to third objects 310 to 330 based on the first to third position information PD1 to PD3 and may control the operation of the first to third objects 310 to 330 as needed. For instance, the main host 410 may compare the first to third position information PD1 to PD3 respectively received from the first to third objects 210 to 330 with existing position information, determine whether to update the existing position information, and then update the existing position information as needed. Each piece of position information updated by and stored in the main host 410 may be used for various functions.

Figure 11:
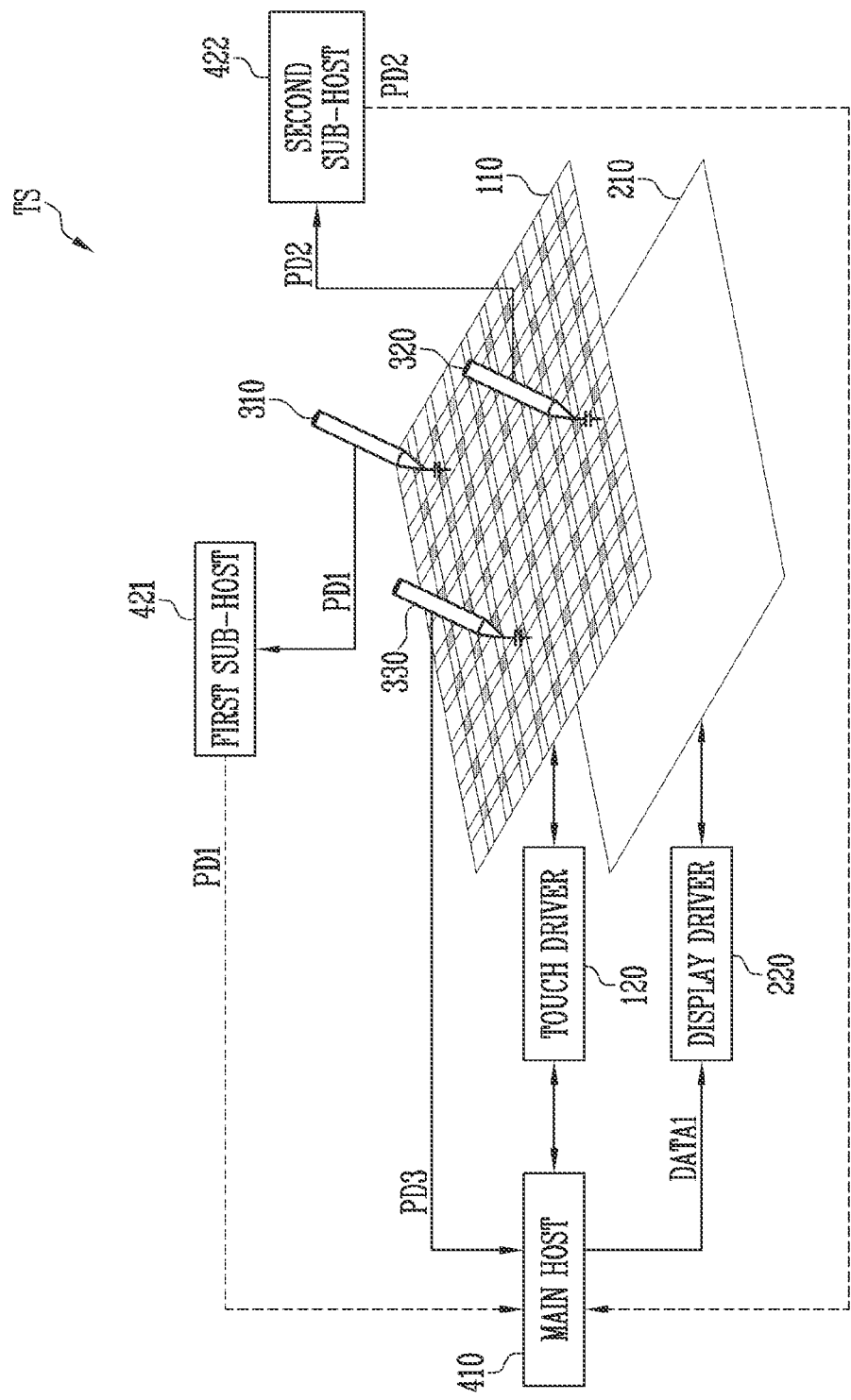
FIG. 11 is a block diagram illustrating an embodiment of the touch system of FIG. 2.

FIG. 11 is a block diagram illustrating an embodiment of the touch system of FIG. 2.

Referring to FIG. 11, a touch system TS in accordance with an embodiment of the present disclosure may include a touch array 110, a touch driver 120, a main host 410, and a plurality of sub-hosts 421 to 422.

The first sub-host 421 may receive first position information PD1 from a first object 310 and may transmit the received first position information PD1 to the main host 410. The first sub-host 421 may be connected to the first object 310 through a radio communication channel such as Bluetooth. The first sub-host 421 may be connected to the main host 410 through a radio communication channel such as Bluetooth. However, embodiments are not limited to the aforementioned example. The first sub-host 421 may be connected to each of the first object 310 and the main host 410 through various communication channels.

The second sub-host 422 may receive second position information PD2 from a second object 320 and may transmit the received second position information PD2 to the main host 410. The second sub-host 422 may be connected to the second object 320 through a radio communication channel such as Bluetooth. The second sub-host 422 may be connected to the main host 410 through a radio communication channel such as Bluetooth. However, embodiments are not limited to the aforementioned example. The second sub-host 422 may be connected to each of the second object 320 and the main host 410 through various communication channels.

The main host 410 may receive third position information PD3 from a third object 330. The main host 410 may be connected to the third object 330 through a radio communication channel such as Bluetooth. Alternatively, the main host 410 may receive a downlink signal DLS including the third position information PD3 through the touch array 110. However, embodiments are not limited to the aforementioned examples. As described above, the main host 410 may receive the first position information PD1 from the first sub-host 421 and may receive the second position information PD2 from the second sub-host 422.

The main host 410 may perform various operations based on the first to third position information PD1 to PD3. For example, the main host 410 may control the display driver 220 to display on the display panel 210 an image according to the first to third position information PD1 to PD3. For instance, the main host 410 may control the operations of the first to third objects 310 to 330 according to the first to third position information PD1 to PD3.

Figure 12:
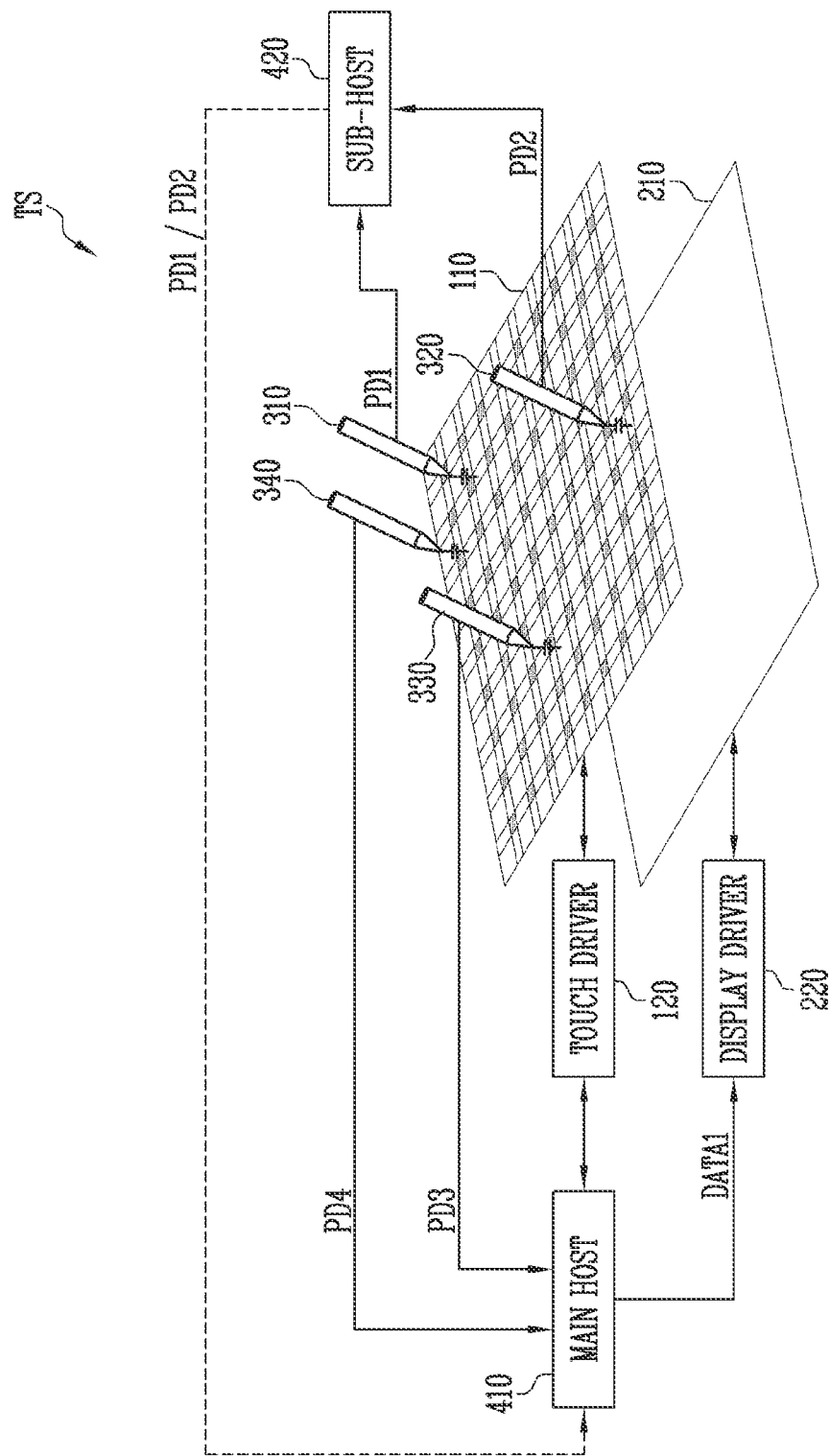
FIG. 12 is a block diagram illustrating an embodiment of the touch system of FIG. 2.

FIG. 12 is a block diagram illustrating an embodiment of the touch system of FIG. 2.

Referring to FIG. 12, a touch system TS in accordance with an embodiment of the present disclosure may include a touch array 110, a touch driver 120, a main host 410, and a sub-host 420.

The sub-host 420 may receive first position information PD1 from a first object 310 and may receive second position information PD2 from a second object 320. The sub-host 420 may be connected to the first object 310 and the second object 320 through a radio communication channel such as Bluetooth. The sub-host 420 may be connected to the main host 410 through a radio communication channel such as Bluetooth. However, embodiments are not limited to the aforementioned example. The first sub-host 420 may be connected to each of the first object 310, the second object 320, and the main host 410 through various communication channels.

The main host 410 may receive third position information PD3 from a third object 330 and may receive fourth position information PD4 from a fourth object 340. The main host 410 may be connected to the third object 330 and the fourth object 340 through a radio communication channel such as Bluetooth. Alternatively, the main host 410 may receive a downlink signal DLS including the third position information PD3 and/or the fourth position information PD4 through the touch array 110. However, embodiments are not limited to the aforementioned example. As described above, the main host 410 may receive the first position information PD1 and the second position information PD2 from the sub-host 420.

The main host 410 may perform various operations based on the first to fourth position information PD1 to PD4. For example, the main host 410 may control the display driver 220 to display on the display panel 210 an image according to the first to fourth position information PD1 to PD4. For instance, the main host 410 may control the operations of the first to fourth objects 310 to 340 according to the first to fourth position information PD1 to PD4.

As described above, in the touch system TS in accordance with embodiments of the present disclosure, uplink signals may be transmitted to a plurality of objects through a single touch driver, and each of the objects may compute corresponding position information, whereby the touch system TS can more rapidly detect touches at the same time. Furthermore, in accordance with embodiments of the present disclosure, the touch system TS may be connected to a plurality of objects through one or more hosts, thus making it advantageous in terms of scalability for the number of objects since there is no limitation on the number of objects.

Various embodiments of the present disclosure may provide a touch system and display device capable of recognizing touches with improved reliability.

The effects of the present disclosure are not limited by the foregoing, and other various effects are anticipated herein.

Although certain embodiments and implementations have been described herein, other embodiments and modifications will be apparent from the foregoing description. Accordingly, the concepts of the present disclosure are not limited to the foregoing embodiments, but rather to the broader scope of the presented claims and various obvious modifications and equivalent arrangements.

What is claimed is:

1. A touch system comprising:
a touch array including a plurality of touch electrodes;
a touch driver configured to apply touch driving signals including different codes respectively to the touch electrodes and to transmit uplink signals to a plurality of objects adjacent to the touch array through the touch electrodes;
at least one sub-host connected to at least one object among the plurality of objects through a direct wireless communication channel between the at least one sub-host and the at least one object, and configured to receive, from the at least one object, position information corresponding to the at least one object through the direct wireless communication channel, the direct wireless communication channel between the at least one sub-host and the at least one object being formed outside of the touch array; and
a main host configured to control the touch driver and to receive the position information corresponding to the at least one object among the plurality of objects through the at least one sub-host.

2. The touch system according to claim 1, wherein the direct wireless communication channel comprises a radio communication channel based on Bluetooth communication.

3. The touch system according to claim 1, wherein the at least one sub-host is connected to the main host through an additional communication channel and transmits the position information corresponding to the at least one object to the main host through the additional communication channel.

4. The touch system according to claim 1, wherein each of the plurality of objects is configured to compute position information corresponding to the object, based on uplink signals received from touch electrodes adjacent to the object among the touch electrodes.

5. The touch system according to claim 1, wherein the uplink signals include digital components representing the different codes and include analog components depending on capacitances between the touch electrodes and the plurality of objects.

6. The touch system according to claim 1,
wherein the touch driver transmits the uplink signals in a first period, and
wherein the at least one sub-host receives the position information corresponding to the at least one object in a second period after the first period.

7. The touch system according to claim 1,
wherein the touch driver receives a downlink signal from a remaining object among the plurality of objects through at least some of the touch electrodes, and
wherein the main host acquires position information corresponding to the remaining object based on the downlink signal.

8. The touch system according to claim 1,
wherein the touch electrodes comprise driving electrodes extending in a first direction, and sensing electrodes extending in a second direction intersecting with the first direction, and
wherein the uplink signals are transmitted through the driving electrodes and the sensing electrodes.

9. The touch system according to claim 1, wherein the at least one sub-host further receives object status information from the at least one object and transmits the object status information to the main host.

10. The touch system according to claim 1, wherein the at least one sub-host comprises a first sub-host configured to receive first position information from a first object among the plurality of objects, and a second sub-host configured to receive second position information from a second object among the plurality of objects.

11. The touch system according to claim 10, wherein the first sub-host further receives third position information from a third object among the plurality of objects.

12. The touch system according to claim 10, wherein the main host receives the first position information from the first sub-host and receives the second position information from the second sub-host.

13. A display device, comprising:
a display panel including a plurality of pixels;
a display driver configured to drive the plurality of pixels;
a touch array including a plurality of touch electrodes;
a touch driver configured to apply touch driving signals including different codes to the touch electrodes to transmit uplink signals to a plurality of objects adjacent to the touch array through the touch electrodes;
at least one sub-host connected to at least one object of the plurality of objects through a direct wireless communication channel between the at least one sub-host and the at least one object, and configured to receive, from the at least one object, position information corresponding to the at least one object through the direct wireless communication channel, the direct wireless communication channel between the at least one sub-host and the at least one object being formed outside of the touch array; and
a main host configured to control the display driver and the touch driver and to receive the position information corresponding to the at least one object among the plurality of objects through the at least one sub-host.

14. The display device according to claim 13, wherein the main host generates image information based on the position information corresponding to the at least one object and provides the image information to the display driver.

15. The display device according to claim 13, wherein the at least one sub-host comprises a first sub-host configured to receive first position information from a first object among the plurality of objects, and a second sub-host configured to receive second position information from a second object among the plurality of objects.

16. The display device according to claim 15, wherein the first sub-host further receives third position information from a third object among the plurality of objects.

17. The display device according to claim 15, wherein the main host receives the first position information from the first sub-host and receives the second position information from the second sub-host.

18. An electronic device, comprising:
- a display device including a display panel, the display panel including a plurality of pixels; and
- a host providing image data to the display device,
- wherein the display device further includes:
- a display driver configured to drive the plurality of pixels;
- a touch array including a plurality of touch electrodes; and
- a touch driver configured to apply touch driving signals including different codes to the touch electrodes to transmit uplink signals to a plurality of objects adjacent to the touch array through the touch electrodes,
- wherein the host includes a main host and at least one sub-host,
- wherein the at least one sub-host is connected to at least one object of the plurality of objects through a direct wireless communication channel between the at least one sub-host and the at least one object, and receives, from the at least one object, position information corresponding to the at least one object through the direct wireless communication channel which is formed outside of the touch array, and
- wherein the main host controls the display driver and the touch driver and receives the position information corresponding to the at least one object among the plurality of objects through the at least one sub-host.

* * * * *